(12) United States Patent
Stephens et al.

(10) Patent No.: US 8,798,320 B2
(45) Date of Patent: Aug. 5, 2014

(54) IMAGE PROCESSING (75) Inventors: Benjamin James Stephens, Bradley Stoke (GB); Yoann Paul Georges Thueux, Torfan (GB); Mark Lawrence Williams, Bristol (GB)

(73) Assignee: BAE Systems PLC, London (GB)

( * ) Notice: Subject to any disclaimer, the term of this patent is extended or adjusted under 35 U.S.C. 154(b) by 97 days.

(21) Appl. No.: 13/702,689

(22) PCT Filed: Sep. 28, 2011

(86) PCT No.: PCT/GB2011/051833
§ 371 (c)(1),
(2), (4) Date: Dec. 7, 2012

(87) PCT Pub. No.: WO2012/046025
PCT Pub. Date: Apr. 12, 2012

(65) Prior Publication Data
US 2013/0083970 A1   Apr. 4, 2013

(30) Foreign Application Priority Data

Oct. 7, 2010 (GB) .................................. 1016896.1
Oct. 7, 2010 (GB) .................................. 10275108.8

(51) Int. Cl.
*G06K 9/00* (2006.01)
*G06T 7/20* (2006.01)

(52) U.S. Cl.
CPC ... *G06K 9/00624* (2013.01); *G06T 2207/30181* (2013.01); *G06T 2207/30232* (2013.01); *G06T 7/2053* (2013.01); *G06T 2207/30248* (2013.01); *G06T 2207/10024* (2013.01)
USPC ............................. 382/103; 382/291; 348/133

(58) Field of Classification Search
USPC ......... 382/100, 103, 106–107, 155, 162–168, 382/173, 181, 194, 209, 232, 254, 276, 286, 382/291, 305, 312, 190, 159; 706/1, 20; 348/159, 143, 133
See application file for complete search history.

(56) References Cited

U.S. PATENT DOCUMENTS 5,805,773 A * 9/1998 Kometani et al. ................ 706/1
8,326,042 B2 * 12/2012 Wu et al. ...................... 382/190

(Continued)

FOREIGN PATENT DOCUMENTS

CH    EP 1862941 A2 * 12/2007
EP    1862941 A2    12/2007

(Continued)

OTHER PUBLICATIONS

*International Search Report (PCT/ISA/210) issued on Mar. 5, 2012, by the European Patent Office as the International Searching Authority for International Application No. PCT/GB2011/051833.

(Continued)

*Primary Examiner* — Seyed Azarian
(74) *Attorney, Agent, or Firm* — Maine Cernota & Rardin (57) ABSTRACT

Apparatus and method for processing a sequence of images of a scene, the method including: tracking a region of interest in the sequence of images (e.g. using a Self Adaptive Discriminant filter); selecting a particular image in the sequence; selecting a set of images from the sequence, the set having one or more images that precede the particular image in the sequence of images; for each pixel in the region of interest in the particular image, determining a value for a parameter; for each pixel in the region of interest of each image in the set of images, determining a value for the parameters; and comparing a function of the determined values for the region of interest in the particular image to a further function of the determined values for the regions of interest in the images in the set of images.

10 Claims, 7 Drawing Sheets

(56) References Cited

U.S. PATENT DOCUMENTS

| | | | |
|---|---|---|---|
| 2001/0036313 | A1 | 11/2001 | Briand et al. |
| 2008/0031493 | A1 | 2/2008 | Brogren et al. |
| 2009/0296989 | A1* | 12/2009 | Ramesh et al. ............... 382/103 |
| 2009/0310820 | A1* | 12/2009 | Williams ...................... 382/103 |
| 2010/0119152 | A1 | 5/2010 | Lv et al. |
| 2012/0133773 | A1* | 5/2012 | Brogren et al. ............... 348/159 |

FOREIGN PATENT DOCUMENTS

| | | |
|---|---|---|
| EP | 2034426 A1 | 3/2009 |
| WO | WO 2007/144580 A1 | 12/2007 |

OTHER PUBLICATIONS

*Written Opinion (PCT/ISA/237) issued on Mar. 5, 2012, by the European Patent Office as the International Searching Authority for International Application No. PCT/GB2011/051833.

*Great Britain Search Report issued Jan. 28, 2011 for Great Britain Application No. GB1016896.1.

*European Search Report issued Mar. 3, 2011 for European Application No. 10275108.8.

*A. Mufit Ferman et al., Group-of-Frames/Pictures Color Histogram Descriptors for Multimedia Applications, Image Processing, 2000, Proceedings, International Conference, Piscataway, NJ, USA, vol. 1, Sep. 10, 2000, pp. 65-68.

*Ullas Gargi et al., Performance Characterization of Video-Shot-Change Detection Methods, IEEE Transactions on Circuits and Systems for Video Technology, vol. 10, No. 1, Feb. 2000, pp. 1-13.

*Alper Yilmaz, et al., Object Tracking: A Survey, ACM Computing Surveys, vol. 38, No. 4, Article 13, Publication Date: Dec. 2006, New York, NY, pp. 1-45.

*Jun Chang et al., Summarization Extraction Method FOR Surveillance Video Based on Color Spatial Distribution Characteristic, International Conference on Digital Object Identifier, Dec. 2009, pp. 1-5.

Notification Concerning Transmittal of International Preliminary Report on Patentability (Forms PCT/IB/326 and PCT/IB/373) and the Written Opinion of the International Searching Authority (Form PCT/ISA/237) dated Apr. 18, 2013, issued in corresponding International Application No. PCT/GB2011/051833. (6 pages).

* cited by examiner

IMAGE PROCESSING

FIELD OF THE INVENTION

The present invention relates to image processing.

BACKGROUND

Change detection algorithms for detecting changes within video feeds are known.

Conventionally, change detection algorithms are used with systems, e.g. Closed-Circuit Television (CCTV) Systems, where the cameras that take the video images are fixed. In such systems, change detection is performed by comparing a current video frame to a learned background image. This technique allows people and vehicles to be detected and tracked.

However, conventional change detection algorithms are not applicable to video data taken with a moving camera. This is because the background image in the video keeps changing, and the perspective of the camera keeps changing.

SUMMARY OF THE INVENTION

In a first aspect, the present invention provides a method of processing a sequence of images of a scene, the method comprising: tracking a region of interest in the sequence of images; selecting a particular image in the sequence; selecting a set of images from the sequence, the set of images comprises one or more images that precede the particular image in the sequence of images; and for each pixel in the region of interest in the particular image, determining a value for one or more parameters; for each pixel in the region of interest of each image in the set of images, determining a value for the one or more parameters; and comparing a function of the determined values for the region of interest in the particular image to a further function of the determined values for the regions of interest in the images in the set of images.

Tracking a region of interest in the sequence of images may be implemented using a Self Adaptive Discriminant filter.

The one or more parameters may comprise red-intensity, green-intensity and blue-intensity of a pixel.

The step of comparing a function of the determined values for the region of interest in the particular image to a further function of the determined values for the regions of interest in the images in the set of images, may comprise: for the particular image, determining a histogram of the determined values for the region of interest in that image; for each of the images in the set of images, determining a histogram of the determined values for the region of interest in that image; determining a histogram that is a function of the histograms determined for each of the images in the set of images; and determining a value of a parameter that is indicative of the difference between the histogram determined for the particular image and the histogram that is a function of the histograms determined for each of the images in the set of images.

The function of the histograms may be a mean of the histograms.

The parameter that is indicative of the difference between the histograms may be a scalar difference.

The method may further comprise comparing the value of the parameter that is indicative of the difference between the histograms to a threshold value.

It may be determined that the region of interest in the particular image is significantly different to the regions of interest in the images in the set of images if the value of the parameter that is indicative of the difference between the histograms is greater than the threshold value.

The method may further comprise storing and/or displaying the particular images if and only if it is determined that the region of interest in the particular image is significantly different to the regions of interest in the images in the set of images.

In a further aspect, the present invention provides apparatus for processing a sequence of images of a scene, the apparatus comprising: one or more sensors arranged to gather a sequence of images; and one or more processors arranged to process the sequence of images according to a method of any of the above aspects.

The one or more sensors may be mounted on an aircraft.

The aircraft may be an unmanned aircraft.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

DETAILED DESCRIPTION

Figure 1:
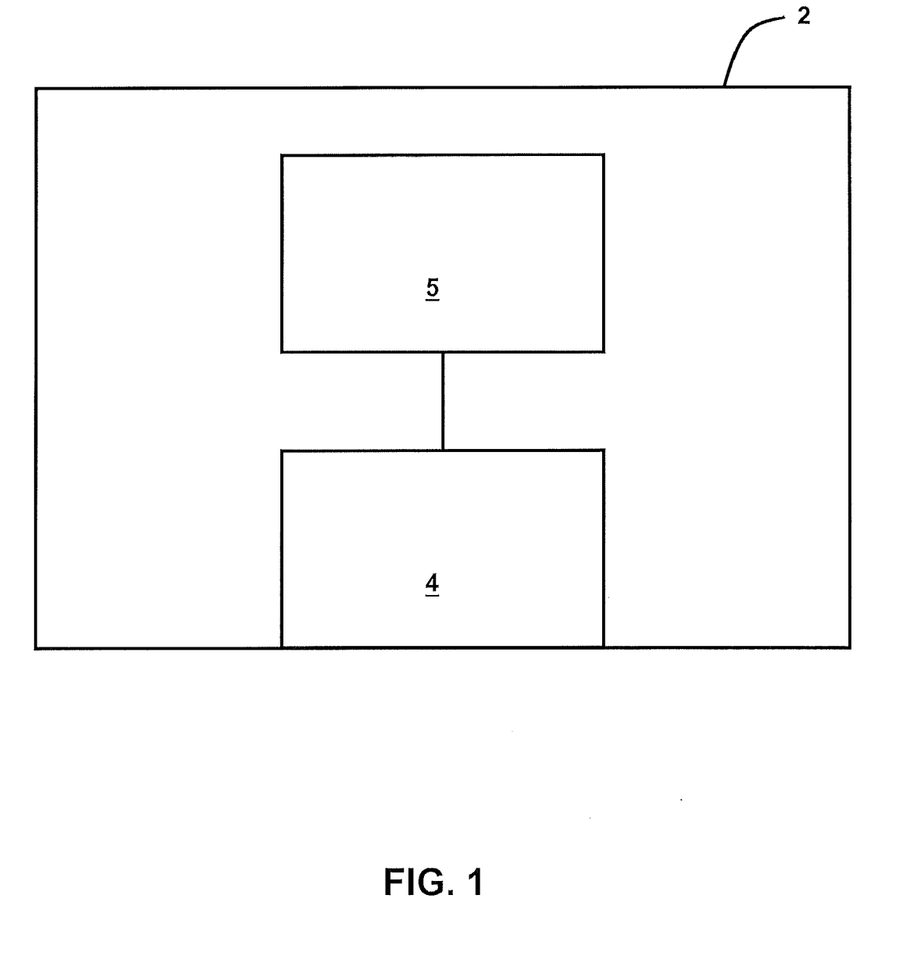
FIG. 1 is a schematic illustration (not to scale) of an aircraft that will implement an example of a change detection algorithm for detecting changes between images of a scene captured using the aircraft.

FIG. 1 is a schematic illustration (not to scale) of an aircraft 2 that will implement an example of a change detection algorithm for detecting changes between images of a scene captured using the aircraft. The change detection algorithm will be described in more detail later below with reference to FIG. 3. The example change detection algorithm is useful in the description of an embodiment of an image comparison process (described in more detail later below with reference to FIG. 5).

In this example, the aircraft 2 is an unmanned aircraft. The aircraft 2 comprises a sensor 4 and a processor 5.

In this example, the sensor 4 is a camera. As the aircraft 2 flies in the proximity of an area of terrain, the sensor 4 is arranged to capture high resolution visible band images of the area of terrain, as described in more details later below with reference to FIG. 2. The sensor 4 is coupled to the processor 5.

In this example, data corresponding to the images captured by the sensor 4 is sent from the sensor 4 to the processor 5. The processor performs the change detection algorithm (described in more detail later below with reference to FIG. 3) on the received data.

Figure 2:
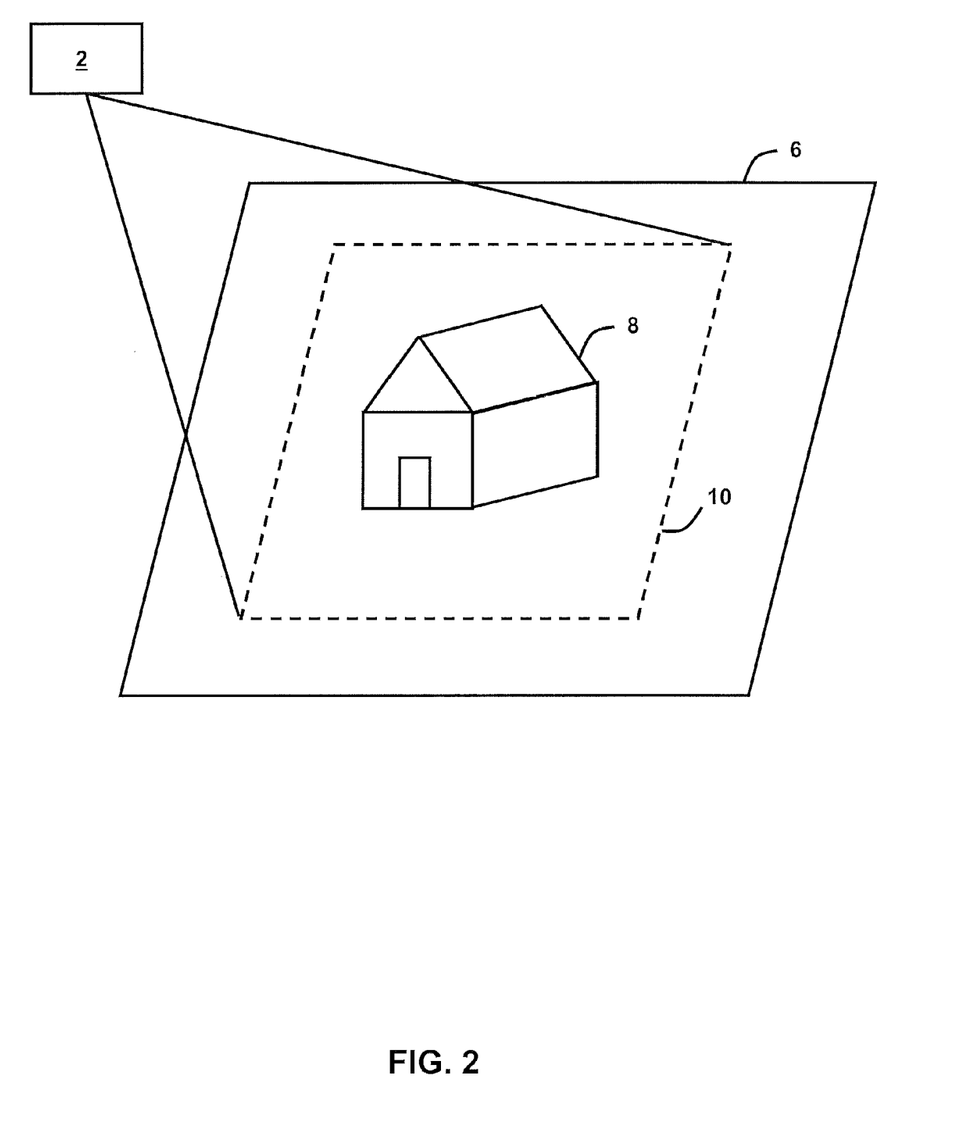
FIG. 2 is a schematic illustration (not to scale) of a scenario in which the aircraft will be used to implement the example of the change detection algorithm.

FIG. 2 is a schematic illustration (not to scale) of a scenario in which the aircraft 2 will be used to implement the example of the change detection algorithm.

In this scenario, the aircraft 2 flies in the proximity of the area of terrain 6.

In this scenario, the area of terrain 6 comprises a house 8 that is to be kept under surveillance using the aircraft 2, i.e. the aircraft 2 is being used in a surveillance operation being performed on the house 8.

In this scenario, the house 8 is to be kept under surveillance using the aircraft for a pre-determined time period, T. The time period T comprises a plurality of time steps $t_1, \ldots, t_N$.

During the time period T, as the aircraft 2 flies in the proximity of the area of terrain 6 the sensor 4 the aircraft captures an image of the house 8 at each time-step $t_i$, i.e. discrete images are taken of the house 8. However, in other scenarios images are taken of the house by the aircraft continuously.

Each image of the house 8 taken by the aircraft 2 corresponds to a region of the area of terrain 6. Such a region in the area of terrain 6 is hereinafter referred to as a "scene" and is indicated in FIG. 2 by a dotted line and the reference numeral 10.

The processor 5 implements the change detection algorithm (described in more detail later below with reference to FIG. 3) on data corresponding to the images gathered by the sensor 4. In this example, the change detection algorithm is implemented to facilitate the surveillance operation being performed on the house 8.

Figure 3:
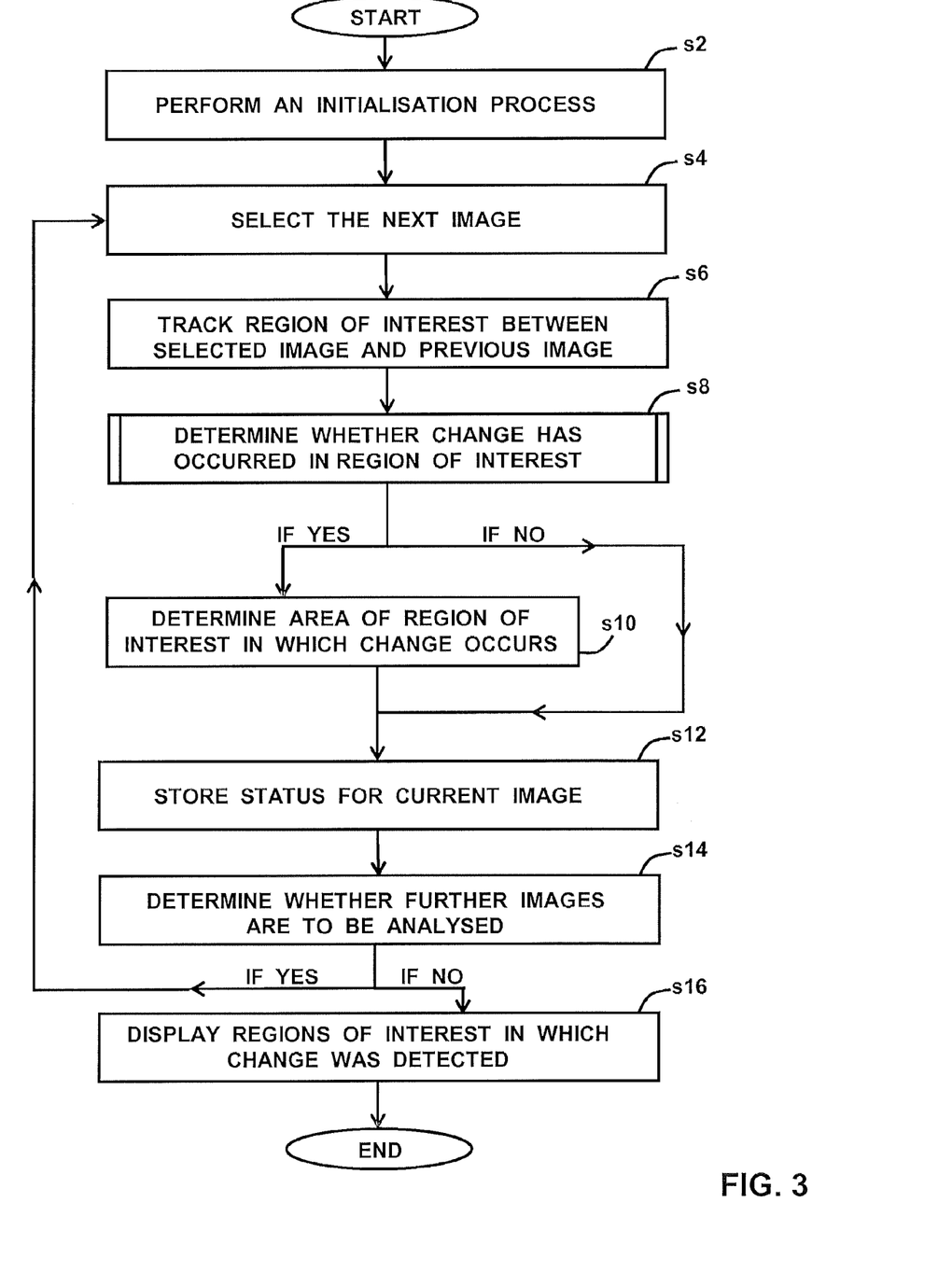
FIG. 3 is a process flowchart showing certain steps of an example of a change detection algorithm.

FIG. 3 is a process flowchart showing certain steps of an example of a change detection algorithm performed by the processor 5 on the images gathered by the sensor 4.

In this example, the change detection algorithm is performed by the processor 5 as the images are taken by the sensor 4, i.e. the algorithm is performed in the field of operation, and during the time period T.

At step s2, an initialisation process is performed to prepare the processor 5 for analysing data being passed to it from the sensor 4.

In this example, the initialisation process of step s2, comprises defining a "region of interest" in an initial image of a scene 10. In this example, the initial image of the scene 10 is an image taken at the start of the time period T, i.e. an image taken at a first time step $t_1$ of T.

The terminology "region of interest" is used herein to refer to an area with an image that is of particular interest to a party performing the surveillance operation.

Figure 4:
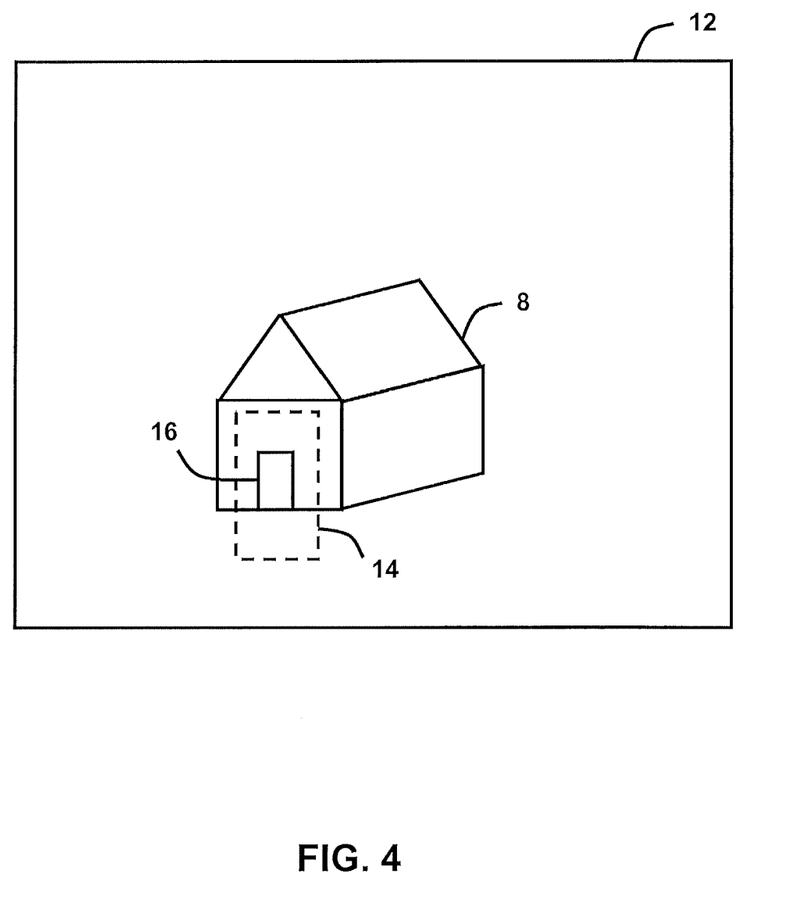
FIG. 4 is a schematic illustration (not to scale) of an initial image and a region of interest defined in that image.

FIG. 4 is a schematic illustration (not to scale) of the initial image 12 and a region of interest 14 defined in that image. In this example, the region of interest 14 is an area of the image 12 that encompasses the door 16 of the house 8. In this example, the region of interest 16 is defined by the party performing the surveillance operation. In this example, the door 16 of the house 8 has been identified as the region of interest 14 by the party performing the surveillance operation because they wish to detect/identify people entering and/or exiting the house 8.

At step s4, the next image, i.e. the image taken by the aircraft at the next time step (e.g. the second time step $t_2$) of the time period T, is selected. This selected image is referred to as "the current image".

At step s6, the position of the region of interest 14 in the current image (selected at step s4) is determined. In this example, this is performed by implementing a tracking process to track the position of the region of interest 14 from the previous image (e.g. the initial image taken at $t_1$) to the current image (e.g. the image taken at $t_2$). In this example, this tracking process is implemented using the Self Adaptive Discriminant (SAD) Filter described in WO2007/144580, which is incorporated herein by reference.

At step s8, it is determined whether there is a significant change between the region of interest 14 in the previous image (e.g. the image taken at $t_1$) and the region of interest 14 in the current image (e.g. the image taken at $t_2$). This step is implemented using an image comparison algorithm, an embodiment of which is described in more detail later below with reference to FIG. 5.

In this example, if it is determined that such change has occurred the algorithm proceeds to step s10. However, if it is determined that no such change has occurred, the algorithm omits step s10 and proceeds to step s12.

At step s10, an area of the region of interest 14 in the current image in which the significant change occurred is identified. The coordinates of a "bounding box" for the area (i.e. a rectangular box, defined in an image and containing all the detected significant change in that image) are determined. In this example, this step is performed using a conventional process.

At step s12, a status for the current image is generated and stored.

In this example, the status comprises an output value, which is a binary indication that a significant change has been detected in the region of interest 14 between the previous image and the current image. In other words, a "0" is stored if a change is not detected, and a "1" is stored if a change is detected. Also, in this example, if a change is detected (i.e. if a "1" is output) the status comprises the coordinates of the corresponding bounding box (determined at step s10). In this example, if a change is detected the status further comprises a time-stamp.

At step s14, it is determined whether there are any further images to be analysed/processed for this implementation of the change detection algorithm. For example, it is determined whether there are any images available for subsequent time-steps.

If it is determined at step s14 that there are further images to be processed, the algorithm proceeds to step s4, selecting the next image as the new current image (e.g. an image taken at $t_3$ becomes the new current image, and the image taken at $t_2$ becomes the previous image). The above described steps s6 to s14, including tracking the region of interest 14, determining whether a significant change has occurred, and outputting a status, are then performed for this new current image. Thus, the steps s4 to s14 are iterated until all images taken by the aircraft 2 (i.e. the N images taken at the time steps $t_1, \ldots, t_N$) have been processed as described above.

If it is determined at step s14 that there are no further images to be processed, the algorithm proceeds to step s16.

At step s16, images of the region of interest 14 at time steps in which a significant change in the region of interest 14 was detected are displayed to a user (i.e. the party conducting the surveillance operation). Also, in this example, alongside the images the respective bounding boxes and time-stamps are displayed.

In other words, the image(s) of a region of interest 14 that correspond to an output value of "1" are displayed. The bounding boxes and time-stamps for those images are also displayed.

In this example, images in which no significant change was detected (i.e. that correspond to an output value of "0") are discarded.

In this example, the image(s) of the region of interest 14 in which a significant change has been detected are displayed after all images have been processed according to steps s4 to s14. However, in other examples, one or more images of the region of interest 14 in which a significant change is detected may be displayed before all the images at subsequent time steps have been processed. For example, in other examples, the images of the region of interest in which a significant change has been detected are displayed to a user as soon as that change is detected.

Figure 5:
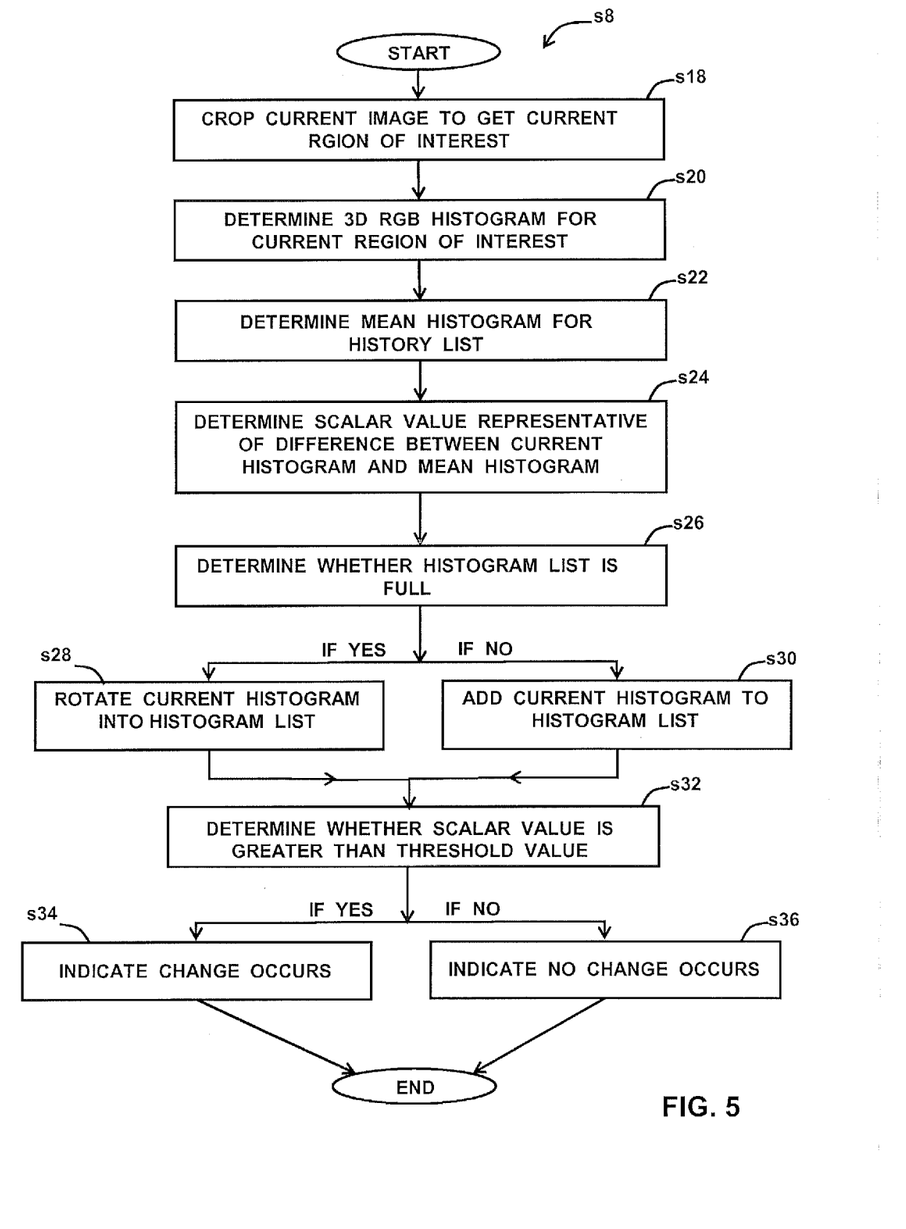
FIG. 5 is a process flowchart showing certain steps of an embodiment of an image comparison process (carried out at step s8 of the change detection algorithm of FIG. 3)

FIG. 5 is a process flowchart showing certain steps of an embodiment of an image comparison process (i.e. the process carried out at step s8 of the change detection algorithm described above with reference to FIG. 3).

At step s18, the current image is cropped to leave only the region of interest 14.

At step s20, a three-dimensional histogram (histogram cube) for the red-green-blue (RGB) values of the pixels in the current cropped image (region of interest 14) is determined. In this embodiment, this is determined as follows.

An RGB value for each pixel is determined in the current cropped image. An RGB value for a particular pixel is expressed as triplet (r, g, b), where r is a value of the red intensity of the pixel, g is a value of the green intensity of the pixel, and b is a value of the blue intensity of the pixel. The value of each component (r, g, and b) can vary from zero to a defined maximum value ($r_{max}$, $g_{max}$, and $b_{max}$ respectively). A three dimensional RGB histogram of these values is determined.

Figure 6:
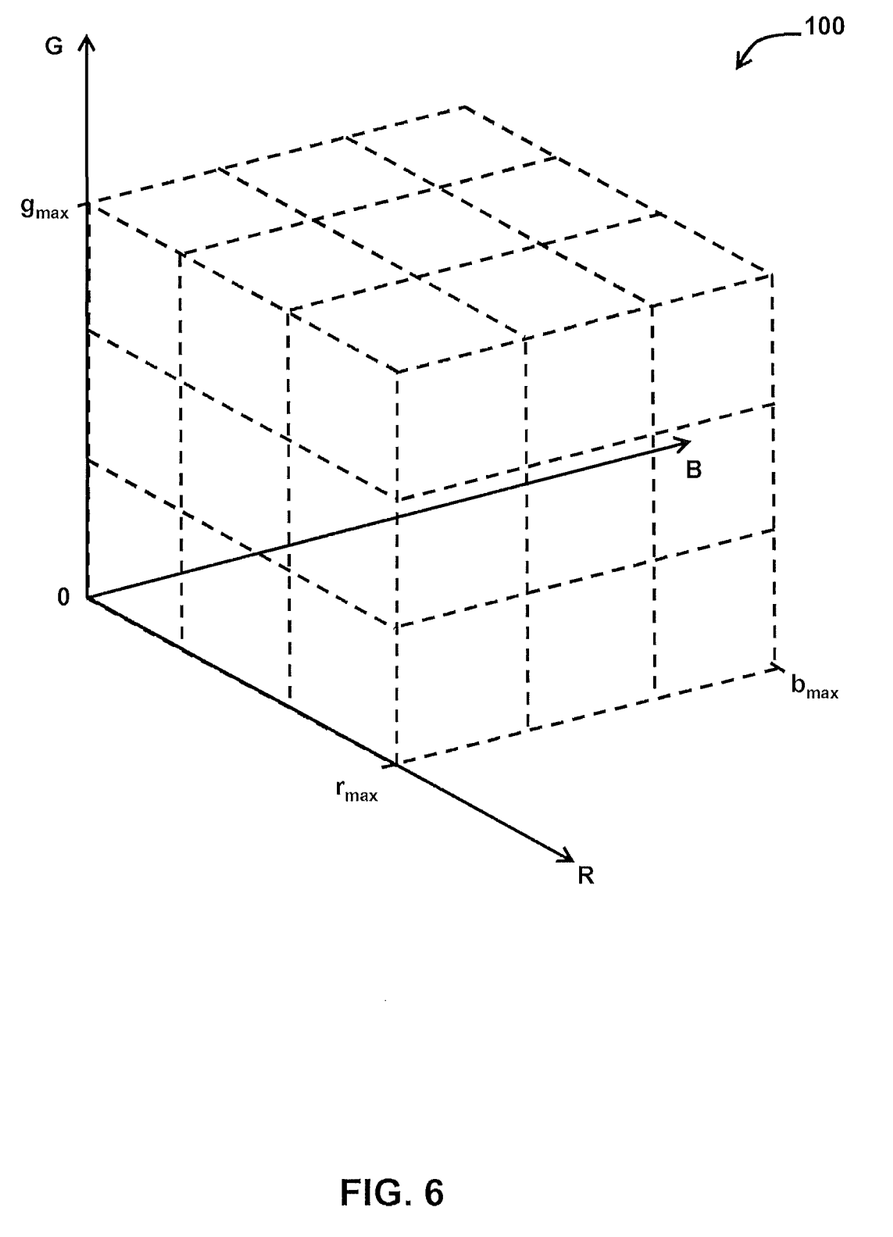
FIG. 6 is a schematic illustration of an example red-green-blue histogram cube.

FIG. 6 is a schematic illustration of an example RGB cube 100. In this example, each of the axes (i.e. the red-axis R, the green-axis G, and the blue-axis B) comprises three bins. The three bins on each of the respective axes cover the range from zero to the respective maximum intensity value, do not overlap, and are of equal size. Thus, the RGB cube 100 comprises 27 sub-cubes, each sub-cube corresponding to a different combination of RGB bins (the sub-cubes are indicated in FIG. 6 by dotted lines).

The values in the RGB cube for the current cropped image are determined by counting, for each sub-cube of the RGB cube, the number of pixels in the cropped image that correspond to the RGB intensity levels of that sub-cube.

At step s22, a mean histogram is determined from the histograms stored in a "history list".

In this embodiment, the history list is a list comprising a number of RGB histogram cubes. The RGB histogram cubes in the list are for the most recent time steps prior to the current time-step. Also, in this embodiment, the number of histogram cubes in the history list is less than or equal to a predetermined threshold H. The value of H may be any value.

For example, if the predetermined threshold for the history list is three (H=3), then if the current time-step is $t_2$ the history list contains the RGB histogram cube for the region of interest 14 in the image taken at $t_1$. Also, if the current time-step is $t_3$ the history list contains the RGB histogram cubes for the region of interest 14 in the images taken at $t_1$ and $t_2$. Also, if the current time-step is $t_4$ the history list contains the RGB histogram cubes for the region of interest 14 in the images taken at $t_1$, $t_2$ and $t_3$. Also, if the current time-step is $t_5$ the history list contains the RGB histogram cubes for the region of interest 14 in the image taken at $t_2$, $t_3$, and $t_4$, etc.

The history list and how it is updated is described in further details at step s26-s30 below.

In this embodiment, the mean histogram for the histogram list has the same sub-cubes (i.e. the same bins) as the histograms in the history list. The value assigned to a sub-cube of the mean histogram is equal to the mean of the values of that sub-cube of all the histograms in the histogram list.

A step s24, a scalar value representative of the difference between the RGB histogram cube for the current cropped image and the mean RGB histogram cube is determined.

In this embodiment, this scalar value is determined using the following formulae:

$$\bar{v}_i = \frac{\sum_{i=1}^{Q} |v_i|}{Q}$$

$$D = \sum_{i=1}^{X} |v_i - \bar{v}_i|$$

where:
X is the total number of bins or sub-cubes in the RGB histogram cube (i.e. in this embodiment X=27);
D is the scalar value;
Q is the number of histograms in the histogram list at the current time-step (n.b. Q≤H, where H is the threshold for the number of histograms in the history list, as described above);
$v_i$ is the value of the ith sub-cube in the RGB histogram cube for the current cropped image; and
$\bar{v}_i$ is the value of the ith sub-cube in the mean histogram.

Thus, if an object were to be present in a current cropped image but not in previous images, the RGB values for the pixels that the object occupies are likely to be very different from the RGB values if no object were there. Therefore, if an object were to be present in a current cropped image but not in previous images, this would tend to produce a relatively large scalar value D.

At step s26, it is determined whether the histogram list is full. In this embodiment, the histogram list is full if there are H RGB histogram cubes in the list (i.e. if the number of histogram cubes in the list is equal to the predetermined threshold). Also, in this embodiment, the histogram list is not full if there are fewer than H RGB histogram cubes in the list (i.e. if the number of histogram cubes in the list is less than the predetermined threshold).

If it is determined that the histogram list is full, the algorithm proceeds to step s28.

If it is determined that the histogram list is not full, the algorithm proceeds to step s30.

At step s28, the current RGB histogram cube is added to the history list. In particular, since the history list has been identified as full (at step s26), the oldest RGB histogram cube (i.e. the RGB histogram cube corresponding to the earliest time-step) is deleted from the history list, and the current RGB cube inserted in its place. After step s28, the algorithm proceeds to step s32.

At step s30, the current RGB histogram cube is added to the history list. Since the history list has been identified as not full (at step s26), the current RGB histogram cube may be added to the history list without having to replace one of the RGB histogram cubes already in the list. After step s30, the algorithm proceeds to step s32.

At step s32, it is determined whether the scalar difference value determined for the current cropped image (at step s24) is greater than a threshold value.

In this embodiment, the threshold value is determined during a training process, as described in more detail later below with reference to FIG. 7. However, in other embodiments, the threshold value may determined by a different method. For example, in other embodiments, the threshold for the scalar difference values is a value determined by a user based on past experience (e.g. using the change detection algorithm in other scenarios).

In this embodiment, if the determined scalar difference value for the current cropped image is greater than the threshold value, then the process proceeds to step s34. However, if the determined scalar difference value for the current cropped image is less than or equal to the threshold value, then the process proceeds to step s36.

At step s34, it is identified that a significant change has been detected in the current cropped image (compared to the means of the cropped images in history list). This identification that a significant change has occurred in the current cropped image triggers the generation of a "1" for the output value in the status (at step s12 above).

After steps s34 the process of step s8 ends. Thus, after step s34, the change detection algorithm proceeds to step s10 as described above.

At step s36, it is identified that no significant change has been detected in the current cropped image (compared to the means of the cropped images in history list). This identification that no significant change has occurred in the current cropped image triggers the generation of a "0" for the output value in the status (at step s12 above).

After steps s36 the process of step s8 ends. Thus, after step s36, the change detection algorithm proceeds to step s12 as described above.

What will now be described is the training process by which the threshold for use at step s32 (i.e. comparing to the scalar difference value determined for the current cropped image) is determined.

Figure 7:
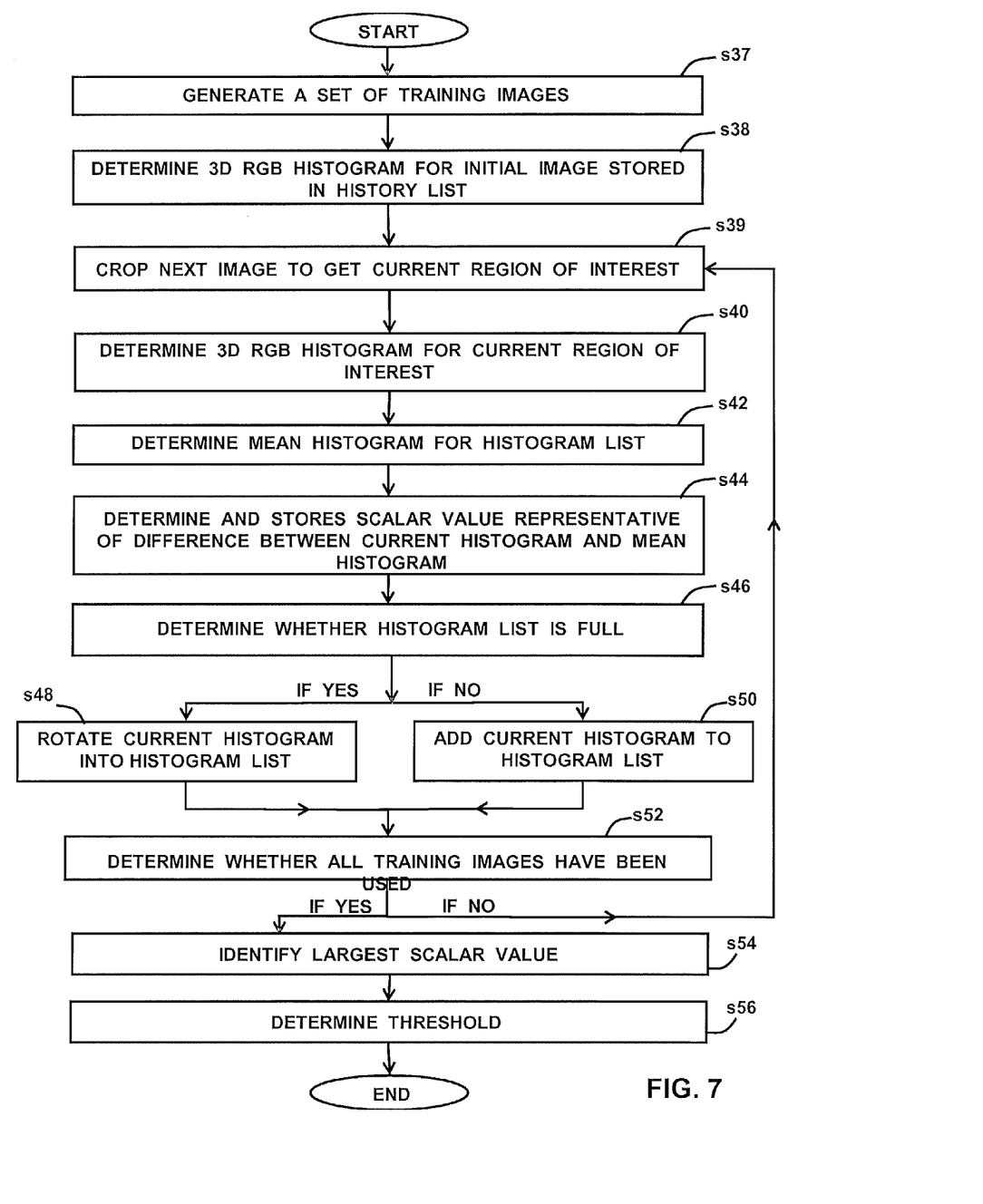
FIG. 7 is a process flow chart for certain steps of a training process for use with the change detection algorithm.

FIG. 7 is a process flow chart for certain steps of the training process.

At step s37, a set of training images are generated.

In this embodiment, the training images are images of the house 8 taken by the aircraft 2 as described for the scenario of FIG. 2, i.e. a sequence of images of the house 8 are captured as the aircraft 2 moves in the proximity of the area of terrain 6 over a period of time.

The number of images in the training set is small relative to the number of images taken by the aircraft 2 during the surveillance operation described above with reference to FIG. 2. For example, the training set of images comprises 10 or 20 images.

In a similar way to that described above at steps s2 for an initial image of the surveillance operation, the region of interest 14 is defined by a user/operator in an initial image of the set of training images. The position of this region of interest 14 in each of the remaining images of the training set is then tracked using a process analogous to that described at steps s4 to s6 above.

In this embodiment, a user/operator ensures that there are no changes that they would deem to be significant between the regions of interest 14 in the images of the training set. For example, the training images may be captured by the aircraft 2 during a period when an operator may be sure there will be no significant change in the region of interest 14 in the images, or the images may be manually checked by an operator to ensure that no significant change has occurred.

Thus, the training set of images comprises a relatively small number of images of the house 8 (taken as the aircraft 2 flies in the proximity of the house 8). In each image, the region of interest 14 is defined. Also, there are no changes that the user/operator would deem to significant between the region of interest 14 in each of the images.

At step s38, for the initial image, an RGB cube is determined for the region of interest 14 (in the same way as described at step s20 above). This RGB cube for the initial image is stored in the history list. Thus, in this embodiment, when performing the training process, at step s37 the history list comprises only the RGB histogram cube for the initial images in the training set.

At step s39, the next image in the sequence of training images image is cropped to leave only the region of interest 14. This cropped region of interest becomes the "current region of interest". In this embodiment, this process is performed in the same way as step s18 above.

At step s40, an RGB cube is determined for the current region of interest. This RGB cube is determined in the same way as that described at step s20 above.

At step s42, a mean histogram is determined from the histograms stored in the history list. In this embodiment, this is determined in the same way as that described at step s22 above.

A step s44, a scalar value representative of the difference between the RGB histogram cube for the current cropped image and the mean RGB histogram cube is determined. In this embodiment, this scalar value is determined in the same way as that described at step s24 above.

In this embodiment, the scalar value determined at step s44 is stored e.g. in a table of scalar values.

At step s46, it is determined whether the histogram list is full. In this embodiment, this is determined in the same way as that described at step s26 above.

If it is determined that the histogram list is full, the algorithm proceeds to step s48.

If it is determined that the histogram list is not full, the algorithm proceeds to step s50.

At step s48, the current RGB histogram cube is added to the history list. In particular, since the history list has been identified as "full" (at step s46), the oldest RGB histogram cube (i.e. the RGB histogram cube corresponding to the earliest time-step) is deleted from the history list, and the current RGB cube inserted in its place. After step s48, the algorithm proceeds to step s52.

At step s50, the current RGB histogram cube is added to the history list. Since the history list has been identified as "not full" (at step s26), the current RGB histogram cube may be added to the history list without having to replace one of the RGB histogram cubes already in the list. After step s50, the algorithm proceeds to step s52.

At step s52, it is determined whether all images in the training set have been processed (by implementing steps s39 to s50 above).

If it is determined that all images in the training set have been processed, the algorithm proceeds to step s54.

If it is determined that all images in the training set have not been processed, the algorithm proceeds to step s39. Thus, the next image in the sequence of images in the training set is processed as described above (i.e. steps s39 to s50 are performed for next unprocessed image in the training set).

At step s54, after all the images in the training set have been processed, the largest scalar value of the scalar values stored at step s44 is identified.

At step s56, the threshold for use at step s32 (i.e. comparing to the scalar difference value determined for the current cropped image) is determined using the identified largest scalar value.

In this embodiment, the threshold is determined using the following formula:

$$threshold = C_{max} + 3\sigma$$

Where:

$C_{max}$ is the identified largest scalar value; and
$\sigma$ is the standard deviation of the set of stored scalar values.

This completes the training process.

Thus, an embodiment of a change detection algorithm for detecting significant changes within a region of interest in a sequence of images is provided. The provided algorithm comprises a process of determining a scalar value for each image in the sequence, the scalar value being indicative of a level of change in the region of interest between that image and a set of previous images. Also, the provided change detection algorithm comprises determining a threshold for comparison with the determined scalar values, the threshold being a value above which determined scalar values correspond to a change in the region of interest deemed to be significant by a user/operator.

An advantage of the provided change detection algorithm is that changes within a region of interest tend to be detectable through an image sequence taken with a moving camera. Thus, problems caused by a constantly shifting background image, and problems caused by changes of perspective of the sensor, tend to be alleviated.

A further advantage provided by the above algorithm is that significant savings in bandwidth, hard disk space, transmission time, and/or operator reviewing time tend to be achievable. These may be achieved by only saving to a hard disk and/or displaying to an operator cropped images that contain a significant change.

A further advantage provided by the above described algorithm is that the change detection process tends to be robust to tracking noise. This is because the RGB content of the region of interest roughly stays in the presence of tracking noise, and only tends to change significantly when an object comes into the region of interest.

A further advantage provided by using the process described above with reference to FIG. 5 is that detecting a change tends to be more robust to the variability of the pixel values than is the case in conventional methods. Also, the use of the RGB cube tends to require less memory and fewer calculations than conventional techniques.

Apparatus, including the processor 5, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media. Moreover, the components of the apparatus may be remote from one another, for example one or more processor of the apparatus may be mounted on the aircraft, whilst different components of the apparatus may be remote from the aircraft, e.g. at a ground station.

It should be noted that certain of the process steps depicted in the flowcharts of FIGS. 3, 5 and/or 7, and described above may be omitted or such process steps may be performed in differing order to that presented above and shown in the respective Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the change detection algorithm is implemented using a sensor and processor onboard an unmanned aircraft. However, in other embodiments the sensor and/or processor may be on a different vehicle or entity e.g. a manned aircraft, a land-based vehicle, or as part of a closed-circuit television (CCTV) network. Also, in the above embodiments the sensor and processor may be remote from one another, e.g. the sensor may be a vehicle mounted sensor, and the processor may be from the vehicle e.g. at a ground station. The sensor data may be transmitted to the processor using any appropriate means.

In the above embodiments, the sensor is a camera arranged to capture high resolution visible band images. However, in other embodiments the sensor may be a different appropriate sensor, for example an infrared camera. Moreover, in other embodiments, more than one sensor (of the same type or of different types) may be used.

In the above embodiments, the change detection algorithm is implemented in the scenario described above with reference to FIG. 2. However, in other embodiments the algorithm may be implemented in any appropriate scenario in which the sensor and the region of interest moves relative to each other.

In the above embodiments, a single region of interest is defined (which is tracked through the image sequence and in which change is detected). However, in other embodiments more than one region of interest may be defined. Moreover, in other embodiments, one or more of the regions of interest may be tracked (and change detected therein) in only part of the image sequence.

In the above embodiments, the tracking of the region of interest throughout the image sequence (described above at step s6) is performed using the Self Adaptive Discriminant (SAD) Filter described in WO2007/144580. However, in other embodiments the tracking of the region of interest is performed using a different appropriate process. For example, in other embodiments a process of correlation-based matching, or template matching, is used.

In the above embodiments, the image comparison process is implemented as part of the above described change detection process. However, in other embodiments, the image comparison process is performed as part of a different appropriate process, or independently from another process.

In the above embodiments, a scalar value representative of the difference between the RGB histogram cube for the current cropped image and the mean RGB histogram cube is utilised. However, in other embodiments any appropriate measure, e.g. a different scalar value or non-scalar value, that is indicative of a difference between RGB cubes may be used.

In the above embodiments, RGB cubes are used to compare one image to another. However, in other embodiments, a different measure of an image is used.

In the above embodiments, the threshold value that the determined scalar difference is compared to is determined using the training process described above with reference to FIG. 7. However, in other embodiments the threshold value may be determined by a different process. For example, the threshold value may be estimated by an expert, or from past experience. Also, in other embodiments, the training process may be performed for a different process, for example, to populate the history list prior to the start of the surveillance operation.

In this embodiment, the threshold value is determined during a training process, as described in more detail later below with reference to FIG. 7. However, in other embodiments, the threshold value may determined by a different method. For example, in other embodiments, the threshold for the scalar difference values is a value determined by a user based on past experience (e.g. using the change detection algorithm in other scenarios).

In the above embodiments, coordinates of a rectangular bounding box that contains all the detected significant change in an image are determined. However, in other embodiments, no bounding box, or a differently shaped bounding box, is determined.

In the above embodiments, at step s12 a status is generated for an image. In the above embodiments, the status comprises an output value (a binary indication that a significant change has been detected), the coordinates of any corresponding bounding box, and a time-stamp. However, in other embodiments, a status may comprise any appropriate information. For example, in other embodiments, the status may comprise one or two of the output value, the coordinates of a bounding box, and a time-stamp, or the status may comprise other information instead of or in addition to those pieces of information, e.g. a value indicative of the level of change in an image (e.g. the scalar value).

In the above embodiments, the process of tracking a region of interest and detecting a change is iterated until all images have been processed. However, in other embodiments the process may be stopped at any point. For example, a process of change detection may be stopped after the first significant change has been detected.

The invention claimed is:

1. A method of processing a sequence of images of a scene, the method comprising:
    tracking a region of interest in the sequence of images using a Self Adaptive Discriminant filter;
    selecting a particular image in the sequence;
    selecting a set of images from the sequence, the set of images containing one or more images that precede the particular image in the sequence of images; and
    for each pixel in the region of interest in the particular image, determining a value for one or more parameters; said parameters comprising red-intensity, green-intensity and blue-intensity of a pixel;
    for each pixel in the region of interest of each image in the set of images, determining a value for the one or more parameters; and
    comparing a function of the determined values for the region of interest in the particular image to a further function of the determined values for the regions of interest in the images in the set of images said comparing of a function of the determined values for the region of interest in the particular image to a further function of the determined values for the regions of interest in the images in the set of images, comprises: for the particular image, determining a histogram of the determined values for the region of interest in that image; for each of the images in the set of images, determining a histogram of the determined values for the region of interest in that image;
    determining a histogram that is a function of the histograms determined for each of the images in the set of images; and determining a value of a parameter that is indicative of a difference between the histogram determined for the particular image and the histogram that is a function of the histograms determined for each of the images in the set of images.

2. A method according to claim 1, wherein the function of the histograms is a mean of the histograms.

3. A method according to claim 1, wherein the parameter that is indicative of the difference between the histograms is a scalar difference.

4. A method according to claim 1, wherein the method comprises:
    comparing the value of the parameter that is indicative of the difference between the histograms to a threshold value.

5. A method according to claim 4, wherein it is determined that the region of interest in the particular image is significantly different to the regions of interest in the images in the set of images if the value of the parameter that is indicative of the difference between the histograms is greater than the threshold value.

6. A method according to any of claim 1, wherein the method comprises:
    storing and/or displaying the particular image only if it is determined that the region of interest in the particular image is significantly different relative to the regions of interest in the images in the set of images.

7. Apparatus for processing a sequence of images of a scene, the apparatus comprising:
    one or more sensors arranged to gather a sequence of images; and
    one or more processors arranged to execute a computer program stored in a non-transitory medium which will cause the one or more processors to process the sequence of images according to a method which includes:
    tracking a region of interest in the sequence of images using a Self Adaptive Discriminant filter;
    selecting a particular image in the sequence;
    selecting a set of images from the sequence, the set of images containing one or more images that precede the particular image in the sequence of images; and
    for each pixel in the region of interest in the particular image, determining a value for one or more parameters, said parameters comprising red-intensity, green-intensity and blue-intensity of a pixel;
    for each pixel in the region of interest of each image in the set of images, determining a value for the one or more parameters; and
    comparing a function of the determined values for the region of interest in the particular image to a further function of the determined values for the regions of interest in the images in the set of images said comparing of a function of the determined values for the region of interest in the particular image to a further function of the determined values for the regions of interest in the images in the set of images, comprises: for the particular image, determining a histogram of the determined values for the region of interest in that image; for each of the images in the set of images, determining a histogram of the determined values for the region of interest in that image;
    determining a histogram that is a function of the histograms determined for each of the images in the set of images; and
    determining a value of a parameter that is indicative of a difference between the histogram determined for the particular image and the histogram that is a function of the histograms determined for each of the images in the set of images.

8. Apparatus according to claim 7, in combination with an aircraft, wherein the one or more sensors are mounted on the aircraft.

9. Apparatus according to claim 8, wherein the aircraft is an unmanned aircraft.

10. A machine readable storage medium storing a program or at least one of the plurality of programs in a non-transitory medium which, when executed by a computer, will cause the computer to implement a method comprising:
- tracking a region of interest in the sequence of images using a Self Adaptive Discriminant filter;
- selecting a particular image in the sequence;
- selecting a set of images from the sequence, the set of images containing one or more images that precede the particular image in the sequence of images; and
- for each pixel in the region of interest in the particular image, determining a value for one or more parameters, said parameters comprising red-intensity, green-intensity and blue-intensity of a pixel;
- for each pixel in the region of interest of each image in the set of images, determining a value for the one or more parameters; and
- comparing a function of the determined values for the region of interest in the particular image to a further function of the determined values for the regions of interest in the images in the set of images said comparing of a function of the determined values for the region of interest in the particular image to a further function of the determined values for the regions of interest in the images in the set of images, comprises: for the particular image, determining a histogram of the determined values for the region of interest in that image; for each of the images in the set of images, determining a histogram of the determined values for the region of interest in that image;
- determining a histogram that is a function of the histograms determined for each of the images in the set of images; and determining a value of a parameter that is indicative of a difference between the histogram determined for the particular image and the histogram that is a function of the histograms determined for each of the images in the set of images.

* * * * *